United States Patent

[11] 3,617,581

[72] Inventors Chun-Shan Wang
 Midland;
 James P. Easterly, Jr., Bay City, both of Mich.
[21] Appl. No. 33,926
[22] Filed May 1, 1970
[45] Patented Nov. 2, 1971
[73] Assignee The Dow Chemical Company
 Midland, Mich.

[54] TREATMENT OF WATER-CONTAINING AROMATIC WASTES
 9 Claims, No Drawings
[52] U.S. Cl. .................................................. 210/62
[51] Int. Cl. .................................................. C02c 5/04
[50] Field of Search ................................. 210/59, 62, 63, 50; 260/623, 687

[56] References Cited
 UNITED STATES PATENTS
 2,487,627 11/1949 Aitken et al. .................. 210/62
 FOREIGN PATENTS
 769,283 3/1957 Great Britain ................. 210/62
Primary Examiner—Michael Rogers
Attorneys—Griswold & Burdick, D. H. Thurston and C. E. Rehberg ABSTRACT: Carbocyclic oxyaromatic and heterocyclic contaminants such as phenols, pyridinols, benzofuran, and derivatives thereof in water are destroyed by dissolving excess alkali in the contaminated water and contacting the alkaline solution with sufficient chlorine to reduce the pH below seven.

TREATMENT OF WATER-CONTAINING AROMATIC WASTES

BACKGROUND OF THE INVENTION

This invention relates to the treatment of waste water or other aqueous streams contaminated with aromatic organic compounds.

Phenol, substituted phenols, analogous hydroxyaromatic compounds, heterocyclic aromatic compounds, and derivatives thereof are commonly encountered contaminants in aqueous wastes from chemical processes. Some of these compounds can be broken down and thereby eliminated by biological means or by oxidation or other simple chemical decomposition but many, for example, chlorinated or nitrated phenols and pyridinols and their esters or ethers particularly are resistant to such conventional treatment. These substances, therefore, pose a difficult waste disposal problem, for wastes containing them obviously cannot be discharged untreated into a stream or into the ocean where they can accumulate and poison the environment.

It has now been found that oxyaromatic and heterocyclic aromatic compounds such as described above are broken down and decomposed into aliphatic fragments which can be handled by conventional waste disposal methods by a process which comprises dissolving in the aqueous stream containing the aromatic contaminants a molar excess based on total aromatics of an alkali metal hydroxide or carbonate and contacting the resulting alkaline solution with sufficient chlorine to reduce the pH of the solution below 7. Preferably, the pH is reduced to a point in the range of 5–7 and a pH about 6 is taken as a convenient end point.

DETAILED DESCRIPTION

Both heterocyclic aromatic compounds and carbocyclic oxyaromatic compounds can be broken down by this process into nonaromatic fragments which are then decomposable by conventional means into harmless products. Exemplary of heterocyclic aromatic compounds are oxygen, nitrogen, and sulfur heterocycles such as pyridine, pyrimidine, acridine, quinoline, quinoxaline, indole, benzoxazole, coumarin, benzofuran, dibenzodioxin, thiophene, benzothiophene, phenothiazine, and phenothioxin. The present process is particularly valuable for the efficient decomposition of oxy derivatives of such heterocycles, for example, pyridinols, quinolinols, and their esters and ethers, especially the ring chlorinated derivatives or these.

The term oxyaromatic compound is defined herein as meaning hydroxyaromatics and their esters and ethers wherein the oxy function is attached directly to the aromatic ring. Included in the group are phenol, phenyl esters, phenyl ethers, and the substituted derivatives of these where the aromatic ring has one or more substituents such as halogen, alkyl, amino, carboxy, or nitro groups. Illustrative compounds of these groups are phenols such as phenol, dichlorophenol, chloronitrophenol, 2,4-dichlororesorcinol, 4-bromo-o-cresol, tetrachloro Bisphenol A, salicylic acid, p-tert-butylphenol, p-aminophenol, and dinitro-o-sec-butylphenol; phenyl esters, both organic and inorganic, such as phenyl benzoate, trichlorophenyl acetate, resorcinol monobenzoate, phenyl salicylate triphenyl phosphate, tri-o-tolyl thiophosphate, phenyl phosphorodichloridate, pentachlorophenyl dimethylcarbamate, O-dichlorophenyl alkylphosphoramidothioates, O-4-tert-butyl-2-chlorophenyl O-methyl methylphosphoramidate, and similar compounds; and phenyl ethers, for example, internal ethers such as benzofuran, coumarin, dibenzodioxin, and benzopyran, also aryl ethers such as phenyl ether, tolyl ether, and particularly lower alkyl phenyl ethers and their substituted derivatives such as p-chloroanisole, 2,4-dichlorophenoxyacetic acid, 2,4,5-trichlorophenoxypropionic acid, nitrophenoxyacetic acid, 2-(dichlorophenoxy)ethanol, and other such compounds. The process is similarly applicable to the sulfur analogs of these compounds, for example, diphenyl sulfide, thiophenols, aromatic thioesters, and the like.

Many of the types of compounds such as listed above are starting materials, byproducts, or the products themselves of processes for making herbicides, insecticides, or other types of pesticide and, consequently, the problem of their proper disposal is one of the increasing concern. The basic problem in the disposal of such materials, for example, in process wastes, is the resistance of an aromatic nucleus to chemical or biological degradation. The important feature of the present invention is that it provides an effective means for breaking down such aromatic rings which are often highly resistant to attack by micro-organisms or by a single chemical reagent such as oxygen, chlorine, or hypochlorite alone. Chlorinated phenols and pyridinols and their esters or ethers as outlined above are particularly difficult to decompose by known methods, but these compounds are completely broken down into relatively harmless aliphatic fragments by the preSent process.

Any alkali metal hydroxide or carbonate is operable in the invention. A sodium or potassium base is preferred and sodium hydroxide is most preferred. More than 1 mole of alkali is used per mole of aromatic ring and preferably a quantity of 5–50 moles of base is employed. The quantity of chlorine to be used is that required to reduce the pH of the alkaline solution to below 7, preferably between 5 and 7 as defined above and so it is dependent upon the quantity of base present. Ordinarily, about half a mole of chlorine is required per mole of base.

The process can be operated at any temperature between the freezing point and boiling point of the aqueous stream being treated. Conveniently, the process is carried out at ambient temperature, for example, 10°–40 C.

EXAMPLE 1

10 grams of sodium hydroxide pellets were dissolved in 100 ml. of a process waste water containing about 2% of O-2,4-dichlorophenyl isopropylphosphoramidothioic acid isopropylamine salt, 0.026% of 2,4-dichlorophenol, 0.07% of O-2,4-dichlorophenyl O-methyl isopropylphosphoramidothioate, and small amounts of methanol, isopropylamine, and methylene chloride. Chlorine gas was then bubbled through the solution until the pH Was reduced to 6 at which point the originally dark-colored solution was essentially colorless. A total of 11 g. of chlorine was added. Ultraviolet spectrometric analysis of the final solution showed that the total aromatic content had been reduced below 20 p.p.m.

EXAMPLE 2

A solution of 5 g. of NaOH in 100 ml. of process waste water containing about 0.5% of 3,5-dichloro-2,6-dimethyl-4 pyridinol and related pyridinols was sparged with chlorine to a final pH 6 when the solution was nearly colorless. Analysis of the chlorinated solution as in example 1 indicated that less than 20 p.p.m. of pyridinols remained.

EXAMPLE 3

5 grams of NaOH was dissolved in 100 ml. of waste water containing about 0.5% of aromatic nitrogen heterocyclic compounds, these being O,O-diethyl O-3,5,6-trichloro-2-pyridinyl phosphorothioate and related chlorinated 2-pyridinol compounds. Chlorine was then bubbled through the solution until it was almost colorless, pH=6. Ultraviolet light spectrometric analysis of the chlorinated solution showed that the aromatic nitrogen heterocyclic compounds had been reduced to less than 25 p.p.m.

EXAMPLE 4

10 grams of NaOH was dissolved in 100 ml. of water containing 1 percent dissolved and suspended 2,4-dichlorophenoxyacetic acid. The mixture was chlorinated as above until all suspended solids ad been dissolved, this requiring 7 g. of chlorine. Analysis of the chlorinated solution as in the foregoing examples revealed an aromatic compound content of less than 30 p.p.m.

EXAMPLE 5

10 grams of NaOH was dissolved in 100 ml. of water containing 1 gram of dissolved and suspended quinoxaline. The mixture was chlorinated as above to pH 6. This required 8 g. of chlorine. Analysis of the chlorinated solution as in the foregoing examples revealed that most of the quinoxaline had been decomposed.

EXAMPLE 6

10 grams of NaOH was dissolved in 100 ml. of water containing 1 gram of dissolved and suspended dibenzofuran. The mixture was chlorinated as above to pH 6, this requiring 8 g. of chlorine. Analysis of the chlorinated solution as in the foregoing examples revealed that most of the dibenzofuran had been decomposed.

EXAMPLES 7–9

In the manner described in examples 1–6, 5–10 g. portions of NaOH were dissolved in each of three 100 ml. samples of water containing 0.1–2 percent of various substituted phenols or phenol derivatives, these being o-sec-butylphenol, 2-sec-butyl-4,6-dinitrophenol, and O-methyl O-4-tert-butyl-2-chlorophenyl methylphosphoramidate respectively. In each case, related phenols or phenol derivatives were also present in similar or lower concentrations. After chlorination to about pH 6, the aromatic compound content of each solution was found to be less than 50 p.p.m.

By the same process, aqueous streams containing minor amounts of other dissolved or suspended carbocyclic oxyaromatics or heterocyclic aromatics and their derivatives Care treated to destroy substantially all of these aromatic compounds. Illustrative of carbocyclic oxyaromatics which are thereby successfully broken down are trichlorophenol, trichlorophenoxypropionic acid, Bisphenol A, tetrachloro Bisphenol A, phenylphenol, cresols, salicyclic acid, phenol, triphenyl phosphate, dimethylaminoxylyl methyl carbamate, o,o-dimethyl o-trichlorophenyl phosphorothioate, tribromophenol, phenyl dimethylphosphorodiamidate, 4-tert-butylpyrocatechol, and other such oxyaromatic organic compounds. The sulfur analogs of these compounds, particularly the thiophenols and esters thereof are also included.

Representative heterocyclic aromatic compounds to which the process of the invention is successfully applied include pyridine, pyridinol and pyridyl esters, coumarin, vanillin, thiophene, benzothiophene, benzodioxin, phenothiazine, and derivatives of such compounds as previously outlined. Chlorinated pyridinols and their ethers and esters are of particular interest, for example, trichloro-2-pyridinol, 3,5-dichloro-2-pyridoxyacetic acid, and polychloropyridyl phosphorothioates.

We claim:

1. A method for degrading an aromatic organic contaminant which is a heterocyclic organic compound or an ester or ether of a chlorinated phenol in an aqueous stream which comprises dissolving in said stream an alkali metal hydroxide or carbonate in molar excess over said aromatic contaminant and contacting the resulting alkaline solution with sufficient chlorine to reduce its pH below 7.

2. The process of claim 1 wherein the alkali metal compound is sodium hydroxide.

3. The process of claim 1 carried out at about ambient temperature.

4. The process of claim 1 wherein the solution is contacted with sufficient chlorine to reduce its pH to about 6.

5. The process of claim 1 wherein the aromatic organic contaminant is an ester or an ether of a chlorinated phenol.

6. THe process of claim 1 wherein the organic contaminant is a heterocyclic organic compound.

7. The process of claim 6 wherein the heterocyclic compound is a chlorinated pyridinol or an ester or ether thereof.

8. The process of claim 5 wherein the organic contaminant is the chlorinated phenyl ester of a phosphorus acid.

9. The process of claim 7 wherein the organic contaminant is the chlorinated pyridyl ester of a phosphorus acid.

* * * * *